(12) United States Patent
Boden et al.

(10) Patent No.: US 6,643,776 B1
(45) Date of Patent: Nov. 4, 2003

(54) SYSTEM AND METHOD FOR DYNAMIC MACRO PLACEMENT OF IP CONNECTION FILTERS

(75) Inventors: Edward B. Boden, Vestal, NY (US); Mark J. Melville, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,718

(22) Filed: Jan. 29, 1999

(51) Int. Cl.[7] ................. G06F 11/30; G06F 15/173; G06F 15/16; G06F 17/30
(52) U.S. Cl. ................. 713/200; 709/224; 709/226; 709/229; 707/9; 707/10
(58) Field of Search ................. 713/200, 201; 709/224, 226, 229; 707/9, 10

(56) References Cited

U.S. PATENT DOCUMENTS

| | | | |
|---|---|---|---|
| 5,696,486 A | 12/1997 | Poliquin et al. | 340/506 |
| 5,777,549 A | 7/1998 | Arrowsmith et al. | 340/506 |
| 5,787,428 A | 7/1998 | Hart | 707/9 |
| 5,835,726 A | 11/1998 | Shwed et al. | 395/200.59 |

FOREIGN PATENT DOCUMENTS

| | | | | |
|---|---|---|---|---|
| JP | 05-120340 | 5/1993 | | G06F/15/40 |
| JP | 2001-167125 | 6/2001 | | G06F/17/30 |

OTHER PUBLICATIONS

"Policy–based Routing", Network iQ Router Reference Manual, Software Release 7.4 DOC–03011–002–9709 (c) 1997, 3 pages. (http://www/3net.co.uk/documentation/rel74/html/ip014.htm).

"Configuring Accept Policies", Bay Networks Apr. 16, 1996, 2 pages. (http://support.baynetworks.com/library/.tpubs/html/router/soft1000/ip/2917A–260.html).

Technical Report of IEICE IN96–144 "A Study On An Automatic Generation and Recovery . . . ", Feb. 21, 1997.

RFC 2401 Security Architecture for the Internet Protocol.

Technical Report of IEICE, IN98–199 "A 50 Mpps Longest Prefix Match Search Engine LS1 . . . ".

Recent Object Orientation Technology '98, pp. 124–132, Firewall Gateway Software Architecture and Framework.

*Primary Examiner*—Gail Hayes
*Assistant Examiner*—Jenise Jackson
(74) *Attorney, Agent, or Firm*—Shelley M. Beckstrand

(57) ABSTRACT

Virtual Private Networking (VPN) is an emerging technology area enabling e-business on the Internet. A key underlying VPN technology is IP Security (IPsec), a means of providing private (encrypted and authenticated) secure data transmission over public (Internet) networks. The definition of what data to protect ultimately results in IP filter rules, loaded to the operating system kernel. These are used to select the correct IP datagrams and cause each to be processed by the correct IPsec Security Associations. Along with other attributes, a VPN connection can be started, stopped, and monitored. Connection filters which are used to implement VPN connections are dynamic, and must be inserted and deleted within the currently installed set of IP filters (non-VPN related). Since IP filter order is crucial to proper functioning, the basic problem is, where to place these dynamic filters. This filter placement problem has a macro and a micro part. The macro filter placement problem is solved, and a customer policy to protect data is enforced, even if no VPN connection is active.

10 Claims, 1 Drawing Sheet

SYSTEM AND METHOD FOR DYNAMIC MACRO PLACEMENT OF IP CONNECTION FILTERS

CROSS REFERENCES TO RELATED APPLICATIONS

U.S. patent application Ser. No. 09/239,693, entitled "System and Method for Managing Security Objects"; Ser. No. 09/240,720, entitled "System and Method for Network Address Translation Integration With IP Security"; Ser. No. 09/239,694, entitled "System and Method for Dynamic Micro Placement of IP Connection Filters"; and Ser. No. 09/240,483, entitled "System and Method for Central Management of Connections in a Virtual Private. Network", filed concurrently herewith are assigned to the same assignee hereof and contain subject matter related, in certain respects, to the subject matter of the present application. The above-identified patent applications are incorporated herein by reference.

BACKGROUND OF THE INVENTION

1. Technical Field of the Invention

This invention pertains to virtual private network (VPN) implementations, a fundamental enabler for E-business. More particularly, it relates to IP security, providing data encryption and authentication at the IP datagram level through the use of VPN policy filters.

2. Background Art

Virtual Private Network (VPN) is a fundamental enabler for electronic business. IP Security, the technology VPNs are built upon, provides data encryption and authentication at the IP datagram level of TCP/IP.

A security policy database (SPD) is, logically, a collection of rules which define how to select IP traffic for the various security associations (SAs). The "SAs" are stored in what is termed the SA database (SAD). Logically, the SPD maps traffic to a particular SA. These are implemented as filter rules. An SPD is a term and concept in the IPsec architecture (RFC 2401), recently approved by the IETF as a proposed standard.

In the prior art, users generate their list of filter rules by hand, and once a set is defined it is an ordered list and is loaded as a set. Once loaded, the set cannot be changed. The rule set is changed by removing the loaded set, and replacing it. It has heretofore not been permitted to load individual filter rules within the set. Thus, the invention objective relates to the dynamic placement of individual filter rules in an existing set of filter rules. The 'placement problem' has two aspects, which must be solved in turn. The first is termed the 'macro' placement problem, because it deals with the large scale placement of filter rules in the set of all system filter rules.

In accordance with current requirements, to ensure consistent, predictable processing, SPD entries must be ordered and the SPD must always be searched in the same order, so that the first matching entry is consistently selected. This requirement is necessary as the effect of processing traffic against SPD entries must be deterministic, but there is currently no way to dynamically order or structure SPD entries. In addition to the problem of physical arrangement, is the important problem of how the various VPN connections which start and stop dynamically, should relate to each other and existing filter rules.

If all the SPD entries were fairly static, a solution is to present the list of SPD entries in some suitable form to the user, who would then order it, then re-load the new ordering. Aside from the perhaps unappealing mechanics, the problem with this is that the SPD entries are not static. Both initiator and responder-mode connections require dynamically loading new connection filters. It is, therefore, not practical to expect the user to order these filters dynamically. Another approach would be to have the user specify an a priori ordering for connections started locally (say, auto-started or scheduled). The problem with this is that it adds yet another level of complexity to the already complex VPN configuration process, and does not work for responder-mode connections without even additional configuration complexity and perhaps unnecessary restrictions on responder-mode connections.

IP filter rules are processed top-to-bottom, in the order given by the user. IP security introduces a new level of complexity, because the filter rules now have to be placed in the right position dynamically by the system, since IP Security connections are dynamic. These filter rules also have to be removed dynamically. The IP Security (IPsec) Architecture (RFC2401) does not actually define, much less suggest a solution for, the placement problem. There is, therefore, a need in the art for a system and method which gives the user direct and simple control over how its IP Security policy is enforced without requiring the customer to order the filter rules for each IP Security connection.

It is an object of the invention to provide an improved system and method for managing a set of filter rules.

It is a further object of the invention to provide a system and method for dynamically loading individual connection filters in a preexisting set of filters.

It is a further object of the invention to provide a system and method for enforcing a user's security policies, in the absence of started connections. It is a further object of the invention to provide a solution for the macro placement of connection filters.

SUMMARY OF THE INVENTION

In accordance with the invention, a system and method are provided for implementing an IP security policy by manually specifying the order of policy filters within a filter set and thereafter dynamically placing VPN connection filters in the set of filters.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
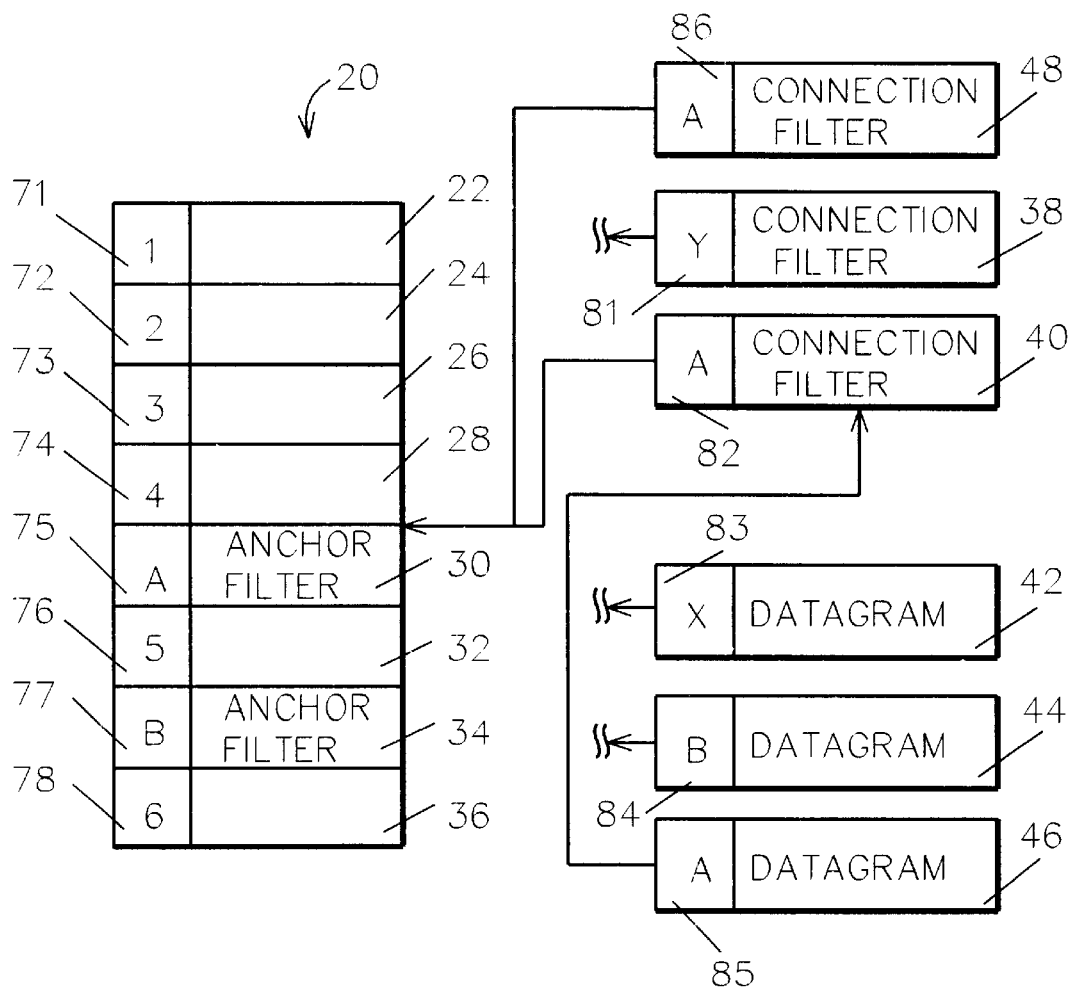
FIG. 1 illustrates a set of existing filters, which includes two policy filters for two VPN policies.

Virtual Private Networking (VPN) is an emerging technology area enabling e-business on the Internet, being delivered in the IBM AS/400. A key underlying VPN technology is IP Security (IPsec), a means of providing private (encrypted and authenticated) secure data transmission over public (Internet) networks. IPsec is an Internet Engineering Task Force (IETF) standards-track protocol (see RFC 2401, IP Security Architecture). Basic to VPN utilization are the customer-specified data protection policies. For the preferred embodiment of the invention on the IBM AS/400, this VPN policy database defines the kinds of network data to protect, and the details of how the customer wants them protected.

The definition of what data to protect ultimately results in IP filter rules, loaded to the IBM OS/400 kernel. These are used to select the correct IP datagrams and cause each to be processed by the correct IPsec Security Associations (SAs, see RFC 2401). VPN on the AS/400 provides the valuable concept of a VPN connection, which is the active, operational use of a previously defined VPN policy. Along with other attributes, a VPN connection can be started, stopped, and can be monitored (via the AS/400 Operations Navigator GUI). So, the connection filters which are used to implement VPN connections are dynamic. They must be inserted and deleted within the currently installed set of IP filters (non-VPN related). Since IP filter order is crucial to proper functioning, the basic problem is, where to place these dynamic filters? This filter placement problem as a macro and a micro part. In accordance with the present invention, (a) the macro filter placement problem is solved (in which role, the policy filter is often termed an anchor filter), and (b) a customer policy to protect data is enforced, even if no VPN connection is active (in which role, the policy filter is termed a policy filter). The micro placement problem is solved in copending patent application Ser. No. 09/239,694.

The connection filter placement objectives discussed above may be viewed as two placement objectives: macro, and micro. The macro objective relates to the dynamic placement of connection filters within a set of all the filters on the system.

In the prior art, users generate their list of filter rules by hand, and once a set is defined it is an ordered list and is loaded as a set. Once loaded, the set cannot be changed. The rule set is changed by removing the loaded set, and replacing it. It has heretofore not been permitted to load individual filter rules within the set. Thus, the macro objective relates to the dynamic placement of individual filter rules in an existing set, and is achieved in accordance with the preferred embodiment of the invention through the use of a special filter referred to as a policy filters or an anchor filter. An anchor filter is a type of filter used to mark the place, in a larger set of filter rules, where a particular data protection policy is to be effected. When a new filter rule (also referred to as an SPD entry) is added to a set of existing filter rules, as distinguished from replacing the entire set, the question is, where to put it? Where, relative to the other entries? This is important, since filter rules are logically processed top-to-bottom and a particular IP packet may easily match more than one rule. This becomes even more important in the context of security policy decisions, which is what each connection filter rule represents.

Referring to FIG. 1, in accordance with the preferred embodiment of the method of the invention, an IPsec user defines a set 20 of filter rules 22–36 which includes within the set an anchor filter 30, which is also known as a policy filter. This set 20 is loaded, as a set, as defined by the customer. In accordance with the preferred embodiment of the invention, VPN connections 38, 40 (also referred to as IPsec connections) are dynamically placed within the loaded (preexisting) set 20 of filter rules as follows. In order to assure that IP traffic that should be protected through some VPN connection does not leave the system unprotected, the name 81 associated with the connection filter 38 is checked in order through the set 20 of filters. If a matching policy filter is not found (which in this case, it does not), the VPN connection 38 fails to load. If, as is the case with connection filter 40, a anchor filter 30 is found which matches, then the VPN connection filter 40 is inserted in the list 20 of rules immediately before this anchor filter 30. The macro placement objective is thus achieved: this connection filter 40 is placed in its proper place in the set 20.

In processing a datagram 42, 44 or 46 through the filter list 20, if the IP datagram 46 matches this connection filter 40, then this connection filter 40 will cause that datagram to be handled according to the IPsec security association (SA) for that connection 40. If in processing the datagram 44 through the filter list, if a policy filter 34 is reached then there is no connection filter in the set 20 for this datagram 44, and the datagram 44 is rejected. Similarly, a datagram 42 is rejected if no filter is found in set 20 having selectors matching the name 83 of this datagram 42. Each policy and connection has the 5 selectors defined by the Ipsec Architecture; source IP address, destination IP address, source port, destination port, and protocol. These are fields in IP datagrams, so the when the values specified in a filter rule match the values in a IP datagram, the filter is said to 'match' the datagram. The allowed values for these selectors are defined in RFC2401; IP address may be a single IP address, a range, a IP address and subnet mask, port and protocol may only be a single value. Any of the selectors may also be unspecified (coded to mean any value is allowed). Datagrams have no connection names. Filters match a datagram based on 'selectors' in filter for data fields in the IP datagrams.

The terms 'policy filter' and 'anchor filter' heretofore used refer to the same special filter 30, 34. 'Policy filter' relates to the use of this special filter to block traffic and enforce the user's security policies. The term 'anchor filter' relates to the use of this same special filter to achieve the macro placement objective.

The micro objective relates to the placement of a plurality of connection filters 40, 48 with respect to these policy filters 30. The micro objective requires that a new connection filter 48 which matches a policy filter 30 (the selectors 75 and 86 match) be placed in proper order within a subset comprising a plurality of connection filters 40, 48 matching the same policy filter 30. The micro objective is achieved in accordance with the preferred embodiment of the filter collision detection invention set forth in copending patent application Ser. No. 09/239,694 System and Method for Dynamic Micro Placement of IP Connection Filters.

Initially, by definition, there are no connection filters in a set 29 of filter rules. Critical to the architecture is that policies are defined for whole groups of connections. Filters 38, 40, 48 that are to be inserted and deleted dynamically are connection filters, and in accordance with the macro objective such connection filters are inserted after initial loading of the set of filter rules immediately before the matching anchor filter 30. When a plurality of connection filters 40, 48 are sequentially processed, each matching a given anchor filter 30, it is necessary to order these matching connection filters. This is the micro objective, and it may be achieved by requiring that the user decide upon the placement. This is a very unattractive solution, and increases the user's work.

Referring again to FIG. 1, in accordance with the preferred embodiment of the invention, a system and method is provided whereby a user need only specify the order of the policy filters 30, 34. Subsequently, system generated connection filters 40, 48 are automatically placed in the list 20 of all IP filters, relative to the appropriate policy filter 30, 34. In this manner, the user is provided a simple and clear manner in which to configure a Virtual Private Network on, for example, the IBM AS/400 system.

The IKE (formerly, ISAKMP) module is responsible for negotiating, creating and maintaining Security Associations (SAs) required for a given policy. A policy is a collection of user-defined filter rules and tunnel descriptions that support a user's particular security policy. A policy filter 30 is characterized by a connection name 75 with sequence number zero (0), whereas a connection filter 40 has a connection name 82 which never has a sequence number zero. A tunnel (synonym for connection) is a bidirectional path defined by a pair of protection suites (one inbound; one outbound). Policy and filter rules select the tunnel of a packet. A protection suit is a single unit of security services that are applied to a packet by a node. Usually, a protection suite is implemented by the application of a single security association (SA) to a packet. A security association (SA) is a unidirectional security protocol specific set of parameters that defines the services and mechanisms necessary to protect traffic between two nodes. A node is, in the specific embodiment of this invention, any system implementing the TCP/IP protocol suite.

IKE negotiates keys used for IPsec for encryption and authentication in two steps, called phases. Phase 1 (a subset of the IKE protocol) is used by the IKE pair to authenticate each other, and agree on how to do phase 2 (how to protect the data sent back and forth during phase 2). Phase 2 itself is used to actually generate and exchange new IPsec keys.

As is further described in copending patent application Ser. Nos. 09/239,693 and 09/239,694, connection definition name and connection name have a direct and important architectural relationship that is exploited throughout the virtual private network solution (VPN). A connection definition name is supplied by the user, in this preferred embodiment through a GUI (the OpNav GUI). A connection name is generated, only by the connection manager, and consists of a connection definition name, followed by a separator, followed by a connection sequence. The connection sequence begins with R or L followed by a numeric. "R" denotes a remotely defined client ID and "L" denotes a locally defined client ID, such as from a user client pair, where a client pair is a pair of IP addresses of the clients of an IPsec connection. The "R" sequence numbers are generated by the connection manager, which guarantees uniqueness. The L sequence numbers are generated by the OpNav GUI as user client pairs are defined and are guaranteed unique in the VPN policy database, with a connection definition. R and L do not correspond to who initiated the connection or who initiated a refresh. They denote who owns the definition of the client IDs. A way to think of L connections is that they are connections that can be started locally (by user, on auto-start, etc.) R connections can only be started for definitions with initialization of external or both, and external definitions can only have R connections. The sequence number of R0 or L0 (R or L followed by a zero) are reserved for internal use by the connection manager and IPsec. It is used to form the connection name on an anchor filter (which is also referred to as a connection definition filter, or a policy filter). Thus, a connection name with sequence 0 is used to indicate a policy filter, and a connection filter has a connection name which never has sequence number 0.

In accordance with the preferred embodiment of the invention, the following elements characterize an IP filter rule list 20, or VPN.

1. A connection definition exists with the property that each connection definition has one and only one phase 2 policy. Thus, any number of connections can be started based on a single connection definition. See copending patent application Ser. No. 09/239,693 for a definition of, and format for, connection definition.

2. An single exception to the above is supported, which is important in the support of remote clients, mobil workers, remote branch offices. This is a means by which multiple data protection policies, associated with multiple connection definitions, are all associated with a single policy filter. This consolidating policy filter has a reserved connection name of DYNAMICIP. The data protection policy is keyed by external user id and the associated connection definition used deferred selectors which are resolved at connection start.

3. An n-to-1 correspondence exists between a connection definition and a filter rule (the anchor filter).

4. Anchor filters have an n-to-1 correspondence to a physical interface. That is, each anchor filter may be applied to multiple physical interfaces, but only zero or one times each.

5. Anchor filters are loaded completely automatically when an interface starts. In other words, if an anchor filter is defined for an interface, the interface cannot start unless the anchor filter is successfully loaded. This enables a mechanism for enforcing a user's IP security policy. An interface is IPsec enabled if, and only if, it has at least one anchor filter. A physical interface is IPsec enabled if there are any policy filters loaded, as part of the rule load, for that interface (for example, a token ring line). (Hence, the term, policy filter.)

6. Anchor filters are explicitly ordered by the user, in the context of all filters so defined. In so doing, the order in which connections for each connection definition are to be processed is defined, hence the order in which policies are to be applied.

7. If during the filter processing (all filter types, logically top-to-bottom), a packet is matched by an anchor filter, the packet is discarded. Anchor filters are identifiable in SLIC because the connection definition value (SPD entry) they specify is the connection definition itself because the name has sequence number 0. In other words, because the IP packet fails to match a prior existing connection, the policy is enforced and the packet is discarded.

8. Detecting and handling connection filter collisions is provided. (See copending application Ser. No. 09/239,694).

9. When a connection filter is loaded, the filter placement process includes two parts: macro placement in context of all filter rules for an interface, and micro placement. With respect to macro placement, the connection filter is placed logically before its matching anchor filter and after any other anchor filters which proceed the matching anchor filter. The matching of anchor to connection is done using the connection name.

Micro placement within connections already started for the connection definition occurs as follows. If no collision is detected, the filter rule is placed anywhere, within the the set of connection filters for the connection definition Otherwise, if the collision was on a source or destination IP address and the collision filter has a subnet mask, then the new filter is placed before the collision filter, meaning that the new connection filter is more specific. (This single exception to collision is allowed due to its utility.)

An IP address (ip addr) that is masked is commonly written as: a.b.c.d/255.255.255.0 where a.b.c.d. is any valid ip addr (each of a-d is a number 1-255, with some exceptions) and the 255.255.255.0 is the mask. The binary representations of the ip addr and mask are bit-wise anded (bit-wise logical 'and' operation) together. The result represents a network.

If a connection filter cannot be loaded, an appropriate return code is provided and the IPsec connection start fails. Pursuant to RFC 2401, an IPsec connection start occurs when an IPsec connection is started; that is, the data to process IP datagrams as required for a particular IPsec connection contained in two or more security associations (SAs) is loaded into the operating system kernel. After this load, IP datagrams that meet the data protection policy will have AH or ESP (or both) applied as requested.

In this manner, filter placement is executed. The user specifies the ordering of policy while the system frees the user from having to order every specific filter rule and protects him from arbitrary (non-deterministic) policy enforcement. If too many connections fail due to collisions, a new connection definition and associated anchor may be created, and that new anchor ordered with respect to existing anchors.

A requirement of IPsec architecture is that for each selector, a policy entry specifies how to derive the corresponding values for a new Security Association Database entry from those in the SPD and the packet. Ranges are supported for IP addresses, but wildcarding can be expressed for all selectors by using the value in the packet itself or using the value associated with the policy entry. Wildcarding is expressed, typically, by use of the '*', which means 'any value'. In accordance with the preferred embodiment of the invention, this requirement is met through the use of the connection definition and connection concepts. It is in the connection definition that the user specifies how to derive selector values for a particular connection generated from this connection definition. The connection granularity can be specified separately for each selector as one of a number of values.

Further in accordance with a preferred embodiment of the invention, when a connection filter is loaded the following audits are performed:
1. During the processing to load any connection filter, whether or not the traffic defined by the new connection filter overlaps the traffic defined by any existing connection for the same connection definition will be determined. In so doing, nested subnets are not counted as collisions. If a collision is found, the connection will fail with an appropriate return code to the connection manager.
2. An anchor filter must exist for each interface for which a connection filter is being loaded.
3. An anchor filter cannot be loaded twice for a given interface.

Table 1 shows the selector granularity values specified in a connection definition and used in the scenarios described hereafter. The value 's' corresponds to use of the value in the packet itself, and the values [f,s,c] correspond to values associated with the policy entry. With reference to granularity: when a connection filter has granularity values of fff, the connection filter consumes the policy filter and is the only connection filter that can be loaded with respect to that policy filter. A single value s connection filter is the other extreme and will always be loaded with respect to a matching policy filter because it cannot overlap with a different connection filter. Granularity values of c give rise to the micro problem, the solution to which requires collision detection.

TABLE 1

SELECTOR GRANULARITY VALUES

| | |
|---|---|
| f | obtain connection selector from connection definition filter (exactly) |
| s | use a single (scaler) value from the IDci or IDcr or an ID (local or remote) in a 'user client pair'. The scalar value must be within the set of values specified for this selector, as determined by the connection definition filter (aka anchor filter). |
| c | use the ID exactly. If external, it is IDci or IDcr. If 'user' initialization, it is the value of an ID in the client pair (local or remote, as appropriate). (Not a valid value for on-demand initialization types.) |

The use of these values is illustrated in Table 2, in which the columns correspond to the start modes of connections. This is what the user (logically) completes as a connection definition is created. 'Selector value' and 'selector granularity value' refer to different things in the following tables. User connection start modes may be manual, auto, or scheduled.

TABLE 2

USE OF SELECTOR GRANULARITY VALUES

| | CONNECTION START MODES | | |
|---|---|---|---|
| SELECTORS | USER | EXTERNAL | ON-DEMAND |
| source ip addr | f, c or s | f, c or s | f or s |
| dest ip addr | f, c or s | f, c or s | f or s |
| source port | f, c or s | f, c or s | f or s |
| dest port | f, c or s | f, c or s | f or s |
| protocol | f, c or s | f, c or s | f or s |

With reference to Table 2:
1. For on-demand, if 'c' is allowed, it will have the same meaning as 's'.
2. Selector granularity values may be specified independently for each selector, in any column.
3. Selector granularity values must be consistent with the connection definition endpoint rules (both local and remote). So, if the local endpoint rule is host, then the granularity values for source ip address and source port selectors must be 's' or 'f'. And if 'f', then the connection definition filter must have scalar values for source ip address and source port. And, if the remote endpoint rule is host, then the granularity values for destination ip address and destination port must be 's' or 'f'. And if 'f', then the connection definition filter must have scalar values for destination ip address and destination port.
4. When user client pairs are defined, values for each column are audited to ensure a) they are within the selector values defined in the connection definition filter, and b) they are in agreement with the selector granularity values for the connection definition. For example, if destination ip in the connection filter is u.v.w.*, a user client pair may not have u.v.*.* for remote client ID. And if the destination ip granularity is 's', the user client pair must have a single ip address for the destination ip of the remote data endpoint.
5. When a connection definition is created that has a static data management policy, user client pairs must be defined and all the selector granularity values default to 'c'.

Referring to Tables 3–6, various scanners illustrate logical views of how anchor and connection filters are used, based on connection definition specifics.

In Table 3, the use of selector granularity values of all 'f' is illustrated. This has the direct consequence that only a single connection may be started for this connection. (ifc start means interface start. conn start means connection start. The connection names are given in old style: boston1:0 would now, using the syntax of connection names previously described, be written boston:L0 or boston:L1.) A filter (and a policy filter) is a series of logical tests. The kinds of filters include policy filter (aka anchor filter), connection filter (not connection definition filter), ipsec filter (rarely used) which is any IPsec-specific filter (including connection filter and policy filter), and filter, which refers to all other filters.

TABLE 3 connection def name=boston1,
initialization=user, roles=gw to gw.

| event | | src ip | dest ip | src port | dest port | proto | connection |
|---|---|---|---|---|---|---|---|
| conn.def. filter | | a.b.c.* | x.y.z.* | * | * | * | |
| selector granularity | | f | f | f | f | f | |
| client pair | | (n/a or none defined) | | | | | |
| after ifc start | 0 | a.b.c.* | x.y.z.* | * | * | * | boston1:L0 |
| | i | x.y.z.* | a.b.c.* | * | * | * | boston1:L0 |
| after conn start | 0 | a.b.c.* | x.y.z.* | * | * | * | boston1:L1 |
| | 0 | a.b.c.* | x.y.z.* | * | * | * | boston1:L0 |
| | i | x.y.z.* | a.b.c.* | * | * | * | boston1:L1 |
| | i | x.y.z.* | a.b.c.* | * | * | * | boston1:L0 |

Referring to Table 4, 's' values are illustrated for source and destination IP address. In this scenario, client pairs must be within connection definition filter (this is always true, for any client pairs defined), only connections defined by some client pair can be started (due to the 's' values). gw refers to gateway. IPsec architecture (RFC2401) defines two IPsec roles: host and gateway. An IPsec client is not considered an IPsec role because although a client sends and receives datagrams that are IPsec'd, a client does not, itself, do IPsec. Any system that does IPsec (that is, implements an IPsec protocol AH,ESP) must be a host or gateway. This role definition applies to each IPsec connection, so a single computer system may function in both roles at the same time.

TABLE 4 connection def name=susan, initialization=user,
roles=gw to gw.

| event | | src ip | dest ip | src port | dest port | proto | connection |
|---|---|---|---|---|---|---|---|
| conn. def. filter | | a.b.c.* | x.y.z.* | * | * | * | |
| selector granularity | | s | s | f | f | f | |
| client pair 1 | | a.b.c.1 | x.y.z.10 | * | * | * | |
| client pair 2 | | a.b.c.2 | x.y.z.11 | * | * | * | |
| after ifc | 0 | a.b.c.* | x.y.z.* | * | * | * | susan:L0 |
| start | i | x.y.z.* | a.b.c.* | * | * | * | susan:L0 |
| after conn start (cp2) | 0 | a.b.c.2 | x.y.z.11 | * | * | * | susan:L11 |
| | 0 | a.b.c.* | x.y.z.* | * | * | * | susan:L0 |
| | i | x.y.z.11 | a.b.c.2 | * | * | * | susan:L11 |
| | i | x.y.z.* | a.b.c.* | * | * | * | susan:L0 |
| after conn start (cp1) | 0 | a.b.c.1 | x.y.z.10 | * | * | * | susan:L23 |
| | 0 | a.b.c.2 | x.y.z.11 | * | * | * | susan:L11 |
| | 0 | a.b.c.* | x.y.z.* | * | * | * | susan:L0 |
| | i | x.y.z.11 | a.b.c.2 | * | * | * | susan:L11 |

TABLE 4-continued connection def name=susan, initialization=user,
roles=gw to gw.

| event | | src ip | dest ip | src port | dest port | proto | connection |
|---|---|---|---|---|---|---|---|
| | i | x.y.z.10 | a.b.c.1 | * | * | * | susan:L23 |
| | i | x.y.z.* | a.b.c.* | * | * | * | susan:L0 |

Referring to Table 5, showing an external scenario, before any phase 2 and connection load, all traffic that matches the anchor filter is discarded, as is always the case, before ipsec connection is started. Further, any phase2 IDcr, IDci negotiated by IKE must be within the connection definition filter selector values; a new connection is allowed if it does not collide with any existing connection; and maximum connections are allowed, due to connection def filter being 255, unless IDcr, IDci include specific port values.

TABLE 5 connection def name=htt, initialization=external,
roles=gw to gw.

| event | | src ip | dest ip | src port | dest port | proto | connection |
|---|---|---|---|---|---|---|---|
| conn def filter | | a.b.c.* | x.y.z.* | * | * | * | |
| selector granularity | | s | s | s | s | f | |
| client pair 1 | | (none allowed) | | | | | |
| after ifc | 0 | a.b.c.* | x.y.z.* | * | * | * | htt:L0 |
| start | i | x.y.z.* | a.b.c.* | * | * | * | htt:L0 |
| after conn start | 0 | a.b.c.5 | x.y.z.15 | 21 | 21 | * | htt:L301 |
| | 0 | a.b.c.* | x.y.z.* | * | * | * | htt:L0 |
| | i | x.y.z.15 | a.b.c.5 | 21 | 21 | * | htt:L301 |
| | i | x.y.z.* | a.b.c.* | * | * | * | htt:L0 |
| after conn start | 0 | a.b.c.5 | x.y.z.15 | 21 | 21 | * | htt:L301 |
| | 0 | a.b.c.7 | x.y.z.17 | 20 | 20 | * | htt:L320 |
| | 0 | a.b.c.* | x.y.z.* | * | * | * | htt:L0 |
| | i | x.y.z.17 | a.b.c.7 | 20 | 20 | * | htt:L320 |
| | i | x.y.z.15 | a.b.c.5 | 21 | 21 | * | htt:L301 |
| | i | x.y.z.* | a.b.c.* | * | * | * | htt:L0 |

Referring to Table 6, an on-demand scenario is illustrated in which the starting of a connection is triggered by the arrival (outbound or inbound) of an IP packet matching the connection definition filter. The triggering IP packet will be buffered until the connection has started. Also, the number of connections is limited due to the 'f' selector granularity values for source, destination port and protocol and anchor filter.

TABLE 6 connection def name=ted,
initialization=external, roles=gw to gw

| event | | src ip | dest ip | src port | dest port | proto | connect |
|---|---|---|---|---|---|---|---|
| conn def filter | | a.b.c.* | x.y.*.* | <1024 | <1024 | * | |
| selector granularity | | s | s | f | f | s | |
| client pair 1 | | (none allowed) | | | | | |
| after ifc start | 0 | a.b.c.* | x.y.*.* | <1024 | <1024 | * | ted:L0 |
| | i | x.y.*.* | a.b.c.* | <1024 | <1024 | * | ted:L0 |
| after conn start | 0 | a.b.c.89 | x.y.102.221 | <1024 | <1024 | tcp | ted:1428 |
| | 0 | a.b.c.* | x.y.*.* | <1024 | <1024 | * | ted:0 |
| | i | x.y.102.221 | a.b.c.89 | <1024 | <1024 | tcp | ted:1428 |
| | i | x.y.*.* | a.b.c.* | <1024 | <1024 | * | ted:0 |

The syntax of a FILTER statement is set forth in Table 7, in which upper case words are keywords; { } brackets denote a set of possible parameter values, one of which is allowed; [ ] brackets denote optional parameters; < > brackets denote parameter group, one parameter of which must be chosen; * is a 'keyword value'; 'number n-m' means number in range n to m (inclusive); each parameter is shown on separate line for convenience; and non-optional parameters are expected in the order shown while optional parameters may appear in any order.

TABLE 7

FILTER STATEMENT

```
FILTER  SET set_name
        ACTION={PERMINT,DENY,IPSEC}
        DIRECTION={INBOUND,OUTBOUND, *}
        SRCADDR{=,< >} {ipaddr,address_name1, *}
        DSTADDR{=,< >} {IPADDR,ADDRESS_NAME2, *}
        <SERVICE=service_name
                        PROTOCOL =
                            {TCP,TCP/STARTING,UDP,ESP,AH,
                            number 0–255, *}
                            DSTPORT{=,< >,<,>,<=,>=} {number 1–
                            65535, *}
                            SRCPORT{=,< >,<,>,<=,>=} {number 1–
                            65535, *}
                        PROTOCOL =  ICMP_TYPE{=,< >,<,>,<=,>=}
                            {typevalue, *}
                                    CODE
                            {=,< >,<,>,<=,>=} {codevalue, *}
        >
        [FRAGMENTS={NONE,HEADERS, *}]
        [CONNECTION_DEFINITION=
        {connectiondef_name,DYNAMICIP}]
        [QOSLEVEL=number 0–16}]
        [JRN={FULL,OFF}]
        [ON-DEMAND={OFF,ON}]
```

In accordance with the preferred embodiment of the invention, a new IPSEC action allows specification of anchor filters. When used, the CONNECTION_DEFININITION parameter must be supplied. If IPSEC is action, then DIRECTION must be OUTBOUND. If IPSEC is action, then protocol may not be icmp or tcp/starting. The new constants for PROTOCOL simply writing IPsec filters. Each connectiondef_name must be unique across all the filter rules loaded for a given interface. The special name DYNAMICIP is used in the anchor filter for IPsec connections whose remote IP address is not known ahead of time; mobile workers, remote branch offices with IP's assigned by their ISP, etc. Connections are started for these systems based on IDcr from IKE, which in turn will use the deferred selectors in the VPN policy database.

The key functional aspects of the preferred embodiment of the invention are:
1. Use of policy filter in role of VPN policy enforcement (Table 8).
2. Use of policy filter in solving macro filter placement problem (Table 9).

In Tables 8 and 9, respectively, these functional steps are described in pseudo-code (C++-like syntax).

TABLE 8

USE OF POLICY FILTER IN ROLE OF VPN POLICY ENFORCEMENT

```
// process an outbound IP datagram against filter rules . . .
while ( more filters exist ) {
    if ( logicalmatch (IPdatagram, filter rule selectors)){
    if ( filter rule action is IPsec &&
        filter rule is a policy filter )
        // since datagram has reached policy filter, there
        // are no connections for this policy filter, so
        return DENY;
```

TABLE 8-continued

USE OF POLICY FILTER IN ROLE OF VPN POLICY ENFORCEMENT

```
    if ( filter rule action is IPsec &&
        filter is VPN connection filter )
        return IPsec;
    return filter rule action; // is PERMIT or DENY;
    } // datagram matches rule
get next filter rule;
} // while ()
```

TABLE 9

USE OF POLICY FILTER TO SOLVE MACRO PLACEMENT PROBLEM

```
// for load of a new connection filter rule . . .
efilterrule = first existing filter rule;
while ( efilterrule != null ) {
    if ( efilterrule.isPolicyFilter() &&
        efilterrule.ConnectionGroup () ==
            newfilterrule.ConnectionGroup() ) {
        // insert new rule before the policy filter. If
        // other connections exist, the insertrule()
        // function will place new rule among them,
        // appropriately.
        insertrule ( newfilterrule, efilterrule ) ;
        break;
    }
    efilterrule = next existing filter rule;
}
```

Advantages Over the Prior Art

It is an advantage of the invention that there is provided an improved system and method for managing a set of filter rules, which include support for VPN and non-VPN filters.

It is a further advantage of the invention that there is provided a system and method for dynamically loading individual connection filters in a preexisting set of policy filters.

It is a further advantage of the invention that there is provided a system and method for enforcing a user's IP data security policies.

It is a further advantage of the invention that there is provided a system and method for macro placement of connection filters.

It is a further advantage of the invention that the ordering of policy filters chosen by the customer is also used for IKE Phase 1 responder-mode connections.

Alternative Embodiments

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Accordingly, the scope of protection of this invention is limited only by the following claims and their equivalents.

We claim:

1. A method for dynamically placing a connection filter within a set of filters, comprising the steps of:

initializing a filter set to include a policy filter;

matching said connection filter sequentially against filters within said set of filters; and responsive to finding a match of said connection filter with a matching policy filter, placing said connection filter in said set of filters before said matching policy filter.

2. The method of claim 1, further comprising the step of:

responsive to finding no match of said connection filter with a matching policy filter, rejecting said connection filter.

3. The method of claim 1, further for processing a datagram and comprising the steps of:

testing said datagram sequentially against filters in said set of filters;

responsive to first finding a matching policy filter, rejecting said datagram; and responsive to first finding a matching connection filter, executing said datagram against said matching connection filter.

4. A system for dynamically placing a connection filter within a set of filters, comprising:

a first computer useable medium having computer readable code module for initializing a filter set to include a policy filter;

a second computer useable medium having computer readable program code module for matching said connection filter sequentially against filters within said set of filters; and a third computer useable medium having computer readable program code module, responsive to finding a match of said connection filter with a matching policy filter, for placing said connection filter in said set of filters before said matching policy filter.

5. The system of claim 4, further for processing a datagram and comprising:

a fourth computer useable medium having computer readable program code module for testing said datagram sequentially against filters in said set of filters;

a fifth computer useable medium having computer readable program code module, responsive to first finding a matching policy filter, for rejecting said datagram; and a sixth computer useable medium having computer readable program code module, responsive to first finding a matching connection filter, for executing said datagram against said matching connection filter.

6. Method for dynamically ordering filters within a set of filters, comprising the steps of:

initializing a filter set to include a plurality of policy filters, the ordering of said plurality of policy filters determining the responder-mode order of search for data protection policies;

matching a connection filter sequentially against filters within said set of filters; and responsive to finding a match of said connection filter with a matching policy filter, placing said connection filter in said set of filters before said matching policy filter.

7. A program storage device readable by a machine, tangibly embodying a program of instructions executable by a machine to perform method steps for dynamically placing a connection filter within a set of filters, said method steps comprising:

initializing a filter set to include a policy filter;

matching said connection filter sequentially against filters within said set of filters; and responsive to finding a match of said connection filter with a matching policy filter, placing said connection filter in said set of filters before said matching policy filter.

8. The program storage device of claim 7, further embodying a program of instructions executable by a machine to perform method steps for processing a datagram, said method steps further comprising:

testing said datagram sequentially against filters in said set of filters;

responsive to first finding a matching policy filter, rejecting said datagram; and responsive to first finding a matching connection filter, executing said datagram against said matching connection filter.

9. An article of manufacture comprising:

a computer useable medium having computer readable program code means embodied therein for dynamically placing a connection filter within a set of filters, the computer readable program means in said article of manufacture comprising:

computer readable program code means for causing a computer to effect initializing a filter set to include a policy filter;

computer readable program code means for causing a computer to effect matching said connection filter sequentially against filters within said set of filters; and computer readable program code means for causing a computer to effect responsive to finding a match of said connection filter with a matching policy filter, placing said connection filter in said set of filters before said matching policy filter.

10. A system for dynamically placing a connection filter within a set of filters, comprising:

means for initializing a filter set to include a policy filter;

means for matching said connection filter sequentially against filters within said set of filters;

means, responsive to finding a match of said connection filter with a matching policy filter, for placing said connection filter in said set of filters before said matching policy filter;

means for testing said datagram sequentially against filters in said set of filters;

means, responsive to first finding a matching policy filter, for rejecting said datagram; and means, responsive to first finding a matching connection filter, for executing said datagram against said matching connection filter.

* * * * *